United States Patent [19]

Clifton et al.

[11] 3,813,654

[45] May 28, 1974

[54] DIAGNOSTIC APPARATUS FOR FETAL HEARTBEAT MONITORING

[75] Inventors: David A. Clifton, Littlehampton; Frederick D. Fielder, Bognor Regis, both of England

[73] Assignee: Sonicaid Limited, Bognor Regis, England

[22] Filed: Oct. 5, 1971

[21] Appl. No.: 186,691

[52] U.S. Cl........... 340/3 D, 128/2.05 T, 128/2.05 Z
[51] Int. Cl............................ G01s 9/66, A61b 5/02
[58] Field of Search.... 340/3 D; 128/2.05 Z, 2.05 S, 128/2.05 T, 24 A; 331/47, 53; 328/38, 140

[56] References Cited
UNITED STATES PATENTS

| 3,561,430 | 2/1971 | Filler, Jr. et al............... | 128/2.05 Z |
| 3,606,879 | 9/1971 | Estes............................ | 128/2.05 Z |

OTHER PUBLICATIONS
A Range–Gated Ultrasonic Doppler System, P. N. T. Wells, Med. & Biol. Eng., Vol. 7, pp. 641–652, Pergamon Press, 1969, Gr. Brit.

Primary Examiner—Maynard R. Wilbur
Assistant Examiner—H. A. Birmiel
Attorney, Agent, or Firm—Baldwin, Wight & Brown

[57] ABSTRACT

The invention relates to diagnostic apparatus including an ultrasonic transmitter and an ultrasonic receiver. The beat signal is passed through a filter to select a particular frequency which occurs once in each heartbeat cycle. A voltage is produced proportional to the time interval between adjacent pulses of this particular frequency and a second train of pulses having a much higher repetition frequency is produced, the frequency of this second pulse train varying inversely with said voltage. The second train is applied to two pump circuit, one of which produces a signal representing the instantaneous frequency of this pulse train and the other of which produces a signal representing the average value of this frequency. The instantaneous signal is applied to a track/store amplifier which is changed over from its tracking function to its storage function when the difference between the instantaneous and average values exceeds a predetermined minimum.

18 Claims, 3 Drawing Figures

DIAGNOSTIC APPARATUS FOR FETAL HEARTBEAT MONITORING

This invention relates to diagnostic apparatus and it is an object of the invention to provide ultrasonic diagnostic apparatus for monitoring the foetal heart movement continuously during labour.

It is a further object of the invention to provide apparatus capable of detecting the heart rate substantially instantaneously by measuring the time interval between individual beats.

Apparatus in accordance with the invention includes means for transmitting ultrasonic energy and for receiving part of said energy after reflection and for mixing it with the energy as transmitted to produce a beat signal. The frequency of the beat signal varies with the rate of movement of the surfaces from which the energy is reflected in accordance with the Doppler principle. It is well known that, in accordance with the Doppler principle, when sound waves are reflected from a moving object, they are shifted slightly in frequency, the shift being proportional to the speed of the object. Accordingly, the heart movements will cause a frequency shift depending on the rate of movement of the heart and this frequency shift may be used as a means for detecting the occurrence of each heart beat.

The invention consists in diagnostic apparatus including means for transmitting ultrasonic energy, means for receiving part of said energy after reflection and for mixing it with the energy as transmitted to produce a signal containing frequencies which vary with the rate of movement of the surfaces from which the energy is reflected, means for selecting at least one band of frequencies from said signal and for deriving a first pulse train therefrom, means for producing a voltage proportional to the time interval between adjacent pulses of the first pulse train, and means for producing a second train of pulses, the pulse repetition frequency of which is greater than the pulse repetition frequency of the first pulse train and varies inversely with said voltage.

From another aspect, the invention consists of any novel features, taken singly or in combination, of the diagnostic apparatus hereinafter described.

It has been found, as a result of experiments, that when ultrasonic energy at a frequency in the region of 2 MHz is radiated toward a foetal heart, reflected energy having a Doppler shift of the frequency of 210 Hz occurs regularly for a short period at the same point in each heartbeat cycle and, accordingly, the occurrence of this frequency may be used as a means of identifying a particular point in each heart cycle. Accordingly, measurement of the time interval between occurrences of this frequency gives an indication of the instantaneous heart rate.

Preferably, apparatus in accordance with the invention includes an ultrasonic generator operating continuously at a frequency in the region of 2 MHz and energising a crystal transducer resonant at the same frequency. Preferably the transducer transmits a divergent beam of ultra sound over a wide angle so that it will be reflected from the foetal heart over a wide range of movement without requiring repositioning, both during contractions and during movement down the uterus. The acoustic energy level may be very low, for example, less than 10 mW/cm$^2$ at the skin surface and, because of the wide spread, it is reduced even further at the foetal site. With such low level energy, only major movements can be detected and the foetal heart itself is normally the only source of movement of the magnitude required in this area. Blood flow, abdominal muscle movements and foetal body movements are either too small or too slow to cause interference or are capable of being effectively eliminated during processing of the received signal. To enable reflections to be received from the wide area covered by the divergent beam, a plurality of receiving crystals are preferably arranged around the transmitting crystal. After amplification, the received signals are mixed with a small proportion of the transmitted signal to produce a beat signal which will include a number of different frequencies corresponding to movements of the foetal heart and any other reflecting surfaces in the path of the divergent beam. The beat signal is applied to a filter with a nominal pass frequency of 210 Hz ± 5 Hz. This filter preferably has an attenuation of at least 36 dB/8ve. The 210 Hz signal selected by the filter is applied to a full-wave detector and is then passed through a low-frequency filter and limiter to produce a pulse train consisting of one pulse for each burst of the selected frequency in the beat signal.

It has been found that there is normally only one major burst of this particular frequency in each heartbeat cycle, but there may be minor occurrences of this frequency between these major bursts. However, the low-frequency filter is tuned to such a frequency that it substantially eliminates the effect of these minor disturbances so that there is normally only one pulse in the pulse train for each heartbeat.

Preferably, said voltage-producing means comprise means for deriving third and fourth time-displaced pulse trains from said first pulse train, the pulses in said third and fourth trains being of shorter duration than the pulses in said first train, integrating means fed from a reference source, means controlled by said third train for sampling the output of said integrating means and means controlled by said fourth train for resetting said integrating means.

Preferably, the means for producing the second pulse train comprise first switching means for connecting the input of a ramp generator alternately to the two terminals of a reference source, a two-state comparator which is in one state when one of its inputs is more positive than the other input and in its other state when its other input is more positive than its one input, and second switching means connecting said one input alternately to the two terminals across which said voltage is produced, wherein the output of said ramp generator is applied to said other input of said comparator, wherein said first and second switching means are controlled by the output of said comparator so that the output of said ramp generator varies in one direction until it reaches the potential of one of said two terminals and in the opposite direction until its output reaches the potential of the other of said two terminals, and wherein said second pulse train is taken from the output of said comparator.

Normally, one of the terminals across which said voltage is produced will be at earth potential and, accordingly, the one input of the comparator may be switched between the live input terminal and earth. In these circumstances, one terminal of the reference source should be positive with respect to earth and the other terminal negative with respect to earth. The ramp generator may be in the form of integrating means and in this case the reference source may be a voltage source one terminal of which is at a constant positive potential with respect to earth and the other terminal of which is at a constant negative potential with respect to earth. Alternatively, the ramp generator may operate on the basis of charging a capacitor, and in this case, the reference source preferably includes two constant-current devices, one serving to charge the capacitor in one direction and the other serving to discharge the capacitor or charge it in the opposite direction. The constant-current sources may be in the form of complementary transistors and the first switching means may be in the form of diodes connected between the output of the comparator and the emitter electrodes of these transistors and serving to switch them on and off alternately.

The second switching means may be, for example, in the form of field effect transistors, the gate electrodes of which are connected to the output of the comparator through resistors and diodes.

Preferably, each pulse in the said third train is initiated by the leading edge of a pulse in said first train and each pulse in said fourth train is initiated by the trailing edge of the corresponding pulse of the second train. Preferably, each of the pulses in said third and fourth train occupies only a small proportion of the duration of a pulse in the first train, this proportion being, for example, 8 percent. It will be understood that the output of the integrator increases substantially linearly from the end of each reset pulse in the fourth train and is returned to zero at the beginning of the succeeding reset pulse. Since the pulses in the third and fourth trains bear a constant relationship to the pulses in the first train, the voltage reached by the output of the integrator when it is sampled under the control of a sampling pulse in the third train will bear a definite relationship to the time interval between two successive pulses in the first train.

Since the reset pulses have a finite width, the output of the integrator will not commence to rise until the end of each reset pulse. It is, however, possible if desired to cause the level of the output of the integrator to be the same as it would have been if the ramp had commenced at the beginning of the reset pulse. For this purpose a storage capacitor is connected, via a diode, to the input of the integrating means and the reset pulse, or another pulse having the same duration as the reset pulse, is applied to this capacitor. Accordingly, this capacitor will charge throughout the reset pulse and the charge on the capacitor will be added to the input of the integrator at the end of the reset pulse so that the ramp voltage increases initially at a greater rate than would have been the case in the absence of the charge on the capacitor.

It will be seen that a voltage is initially produced which is proportional to the time interval between the pulses of the first pulse train and this voltage is then used to produce a second pulse train, the pulse repetition frequency of which is inversely proportional to said voltage.

Thus, the system converts a frequency to another (normally higher) frequency which is directly proportional to the first, with any desired ratio. The merit of the system lies in the fact that the second frequency is based on an instantaneous assessment of the input frequency derived from measurement of the input period.

Such a system could, therefore, measure the equivalent frequency of a single isolated cycle. A particular advantage of the system is that the output frequency may be chosen to drive a digital or analogue display which can respond much faster than a similar system applied to the input frequency directly.

In any diagnostic apparatus, spurious signals are liable to be produced. These spurious signals may be produced either by unusual movements of the organ being monitored, or by movement of the body containing the organ. Alternatively, they may be caused by the transducer used to convert the movements to be monitored into electrical signals responding to other external influences.

To facilitate the interpretation of the recorded data, it would be possible to provide means for averaging the value of the quantity being measured to decrease the effect of the spurious signals. However, such an average value might well obscure small changes in the quantity which could give a misleading result. Further, the spurious signals may have a considerable amplitude and, accordingly, may have a considerable effect on the average value.

Accordingly, apparatus in accordance with the invention preferably includes means for generating a first electrical quantity representing the pulse repetition frequency of said second pulse train measured over a first predetermined time, means for generating a second electrical quantity representing the pulse repetition frequency of said second pulse train measured over a second predetermined period of time shorter than said first period of time, means for comparing said first and second quantities and for producing a switching signal when the difference between said quantities exceeds a predetermined minimum, and a memory device for storing said second quantity, wherein said measuring device is controlled by said switching signal in such a way that, in the absence of the switching signal, the output of the memory device represents the instantaneous value of said second quantity, whereas, in the presence of said switching signal, the output of the memory device represents the value of said second quantity immediately before the beginning of the switching signal.

The means for comparing said first and second quantities may comprise an operational amplifier, the output of which is applied to a level detector which produces said switching signal when the difference between said quantities exceeds a predetermined minimum. The memory device may be in the form of a track-store amplifier, the output of which operates a recording device. In addition to the signal input a track/store amplifier has a control input enabling it to be changed from its tracking function to its storage function. When a signal is applied to the control input of a track/store amplifier, the output signal ceases to follow (track) the input signal, so that changes in the input signal cease to affect the output signal. In the present arrangement, the signal representing the instantaneous value of the quantity is applied to the signal input of the track/store amplifier which, in the absence of the switching signal, follows the variations of this quantity and operates the recording device in accordance therewith. The switching signal is applied to the control input of the track/store amplifier so that, if the switching signal is produced, the amplifier is changed over to its storage function. Under these circumstances the track/store amplifier will continue to supply to the recording device a signal representing the value of the quantity immediately before the occurrence of the switching signal.

The means for generating the first and second electrical quantities may be constituted respectively by first and second transistor pump (storage counter) circuits, one of which has a time constant much longer than the other. Each of these pump circuits may include a first capacitor in series with a diode, the junction of said capacitor and said diode being connected to the emitter of a transistor the collector of which is connected to a resistive load in parallel with which is a second capacitor. In such an arrangement, the voltage across the second capacitor is a measure of the pulse repetition rate of the input signal. If the second capacitor has a relatively low value the voltage across it can follow all variations in the repetition rate, whereas, if the second capacitor is given a large value, the voltage across it will only respond gradually to changes in the repetition rate so that an average value is produced.

It will be understood that, in an arrangement as so far described, the leading edge of any spurious signal will reach the output of the track/store amplifier before the amplifier can be changed over to its storage function. Accordingly, if the recording means is able to respond to this leading edge, the recorded signal will be affected and may be misleading. It is, therefore, preferred that either delay means should be included between the pump circuit producing the instantaneous value and the signal input of the track/store amplifier, or that the amplifier should be periodically changed over to its storage function to ensure that the switching signal can be produced before any spurious signal is applied to the signal input.

When apparatus in accordance with the invention is used for monitoring the foetal heart rate during labour, the pulse repetition rate of the first pulse train can only vary once in each heartbeat cycle and, accordingly, blanking pulses can be produced to change over the amplifier periodically until shortly after the production of each new value. As a result, each new value only affects the output of the track/store amplifier if the switching signal is not produced as a result of the occurrence of that particular value.

One method of performing the invention will now be described with reference to the accompanying diagrammatic drawings, in which.

Figure 1:
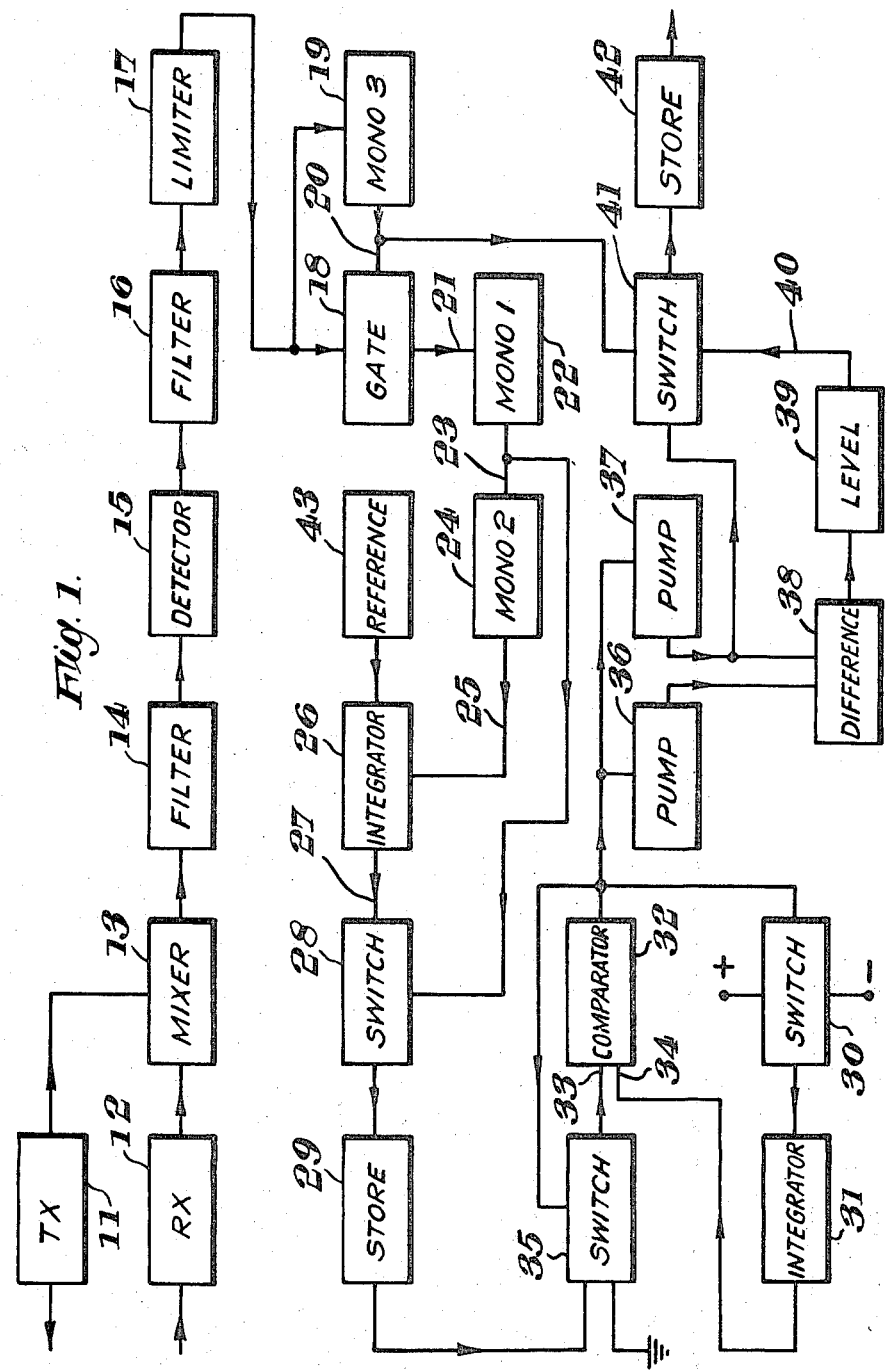
FIG. 1 is a block diagram of apparatus in accordance with the invention.

The apparatus illustrated in FIG. 1 includes an ultrasonic generator 11, operating continuously at a frequency in the region of 2 MHz and energising a crystal transducer (not shown) resonant at the same frequency. Preferably, the transducer transmits a divergent beam of ultra sound over a wide angle so that it will be reflected from the foetal heart over a wide range of movement without requiring repositioning, both during contraction and during movement down the uterus. The acoustic energy level may be very low, for example, less than 10 mW/cm² at the skin surface and, because of the wide spread, it is reduced even further at the foetal site. With such low-level energy only major movements can be detected and the foetal heart itself is normally the only source of movement of the magnitude required in this area. Bloof flow, abdominal muscle movements and foetal body movements are either too small or too slow to cause interference or are capable of being effectively eliminated during processing of the received signals. To enable reflections to be received from the wide area covered by the divergent beam, a plurality of receiving crystals are arranged around the transmitting crystal. The receiving crystals are connected to an ultrasonic receiver 12 and, after amplification, the received signals are mixed in a mixer 13 with a small proportion of the transmitted signal to produce a beat signal the frequency of which will vary with the rate of movement of the foetal heart and any other reflecting surfaces in the path of the divergent beam in accordance with the Doppler principle. The beat signal will include a number of different frequencies and is applied to a filter 14 with a nominal pass frequency of 210 Hz ± 5 Hz. This filter preferably has an attenuation of at least 36 dB/8ve. The 210 Hz signal selected by the filter is applied to a full-wave detector 15 and is then passed through a low-frequency filter 16 and a limiter 17 to produce a pulse train consisting of one pulse for each burst of the selected frequency in the beat signal.

It has been found that there is normally only one major burst of this particular frequency in each heartbeat cycle, but there may be minor occurrences of this frequency between these major bursts. However, the low-frequency filter 16 is tuned to such a frequency that it largely eliminates the effect of these minor disturbances so that there is normally only one pulse in the pulse train for each heartbeat. The particular band of frequencies located 5 Hz on each side of 210 Hz has been selected as a result of experiments with a large number of foetal hearts. However, it is to be understood that the invention is not limited to the use of this particular band of frequencies nor necessarily to the selection of a single band of frequencies since, if the apparatus is to have a wide range of applications, it may be desirable to provide more than one filter 14 so that a number of bands may be applied either simultaneously or successively to the detector 15.

Although most of the spurious signals are removed by the low-frequency filter 16 and the limiter 17, additional means are provided to decrease further the chances of the apparatus responding to signals other than the desired signals. Part of this additional means is represented by a gate 18 and a monostable device 19. Normally, the minimum interval between successive foetal heartbeats is 270 mS and, accordingly, any signals occurring within 270 mS after a heartbeat may be regarded as spurious signals. Thus, the monostable device 19 is arranged to be triggered by the leading edge of a pulse in the pulse train received from the limiter 17 and provides an output on a line 20 for 270 mS from its triggering. This output on the line 20 is used to disable the gate 18 so that the pulse train cannot reach the line 21 during this period.

The pulses allowed through the gate 18 are applied to a further monostable device 22 which is again triggered by the leading edge of a pulse in the pulse train and provides an output on a line 23 for 20 mS after triggering. This line 23 is applied to a further monostable device 24 which is triggered by the trailing edge of the pulse on the line 23. The monostable device 24 provides an output on a line 25 for 20 mS after it has been triggered. Thus, there is a train of 20 mS pulses on the line 23, each corresponding to a foetal heartbeat and a train of 20 mS pulses on the line 25, each occurring immediately after the end of a corresponding pulse on the line 23.

An integrator 26 is fed from a reference source 43 and its output on a line 27 increases substantially linearly from the time when the integrator is reset. The pulse train on the line 25 is fed to the resetting input of the integrator 26 so that the output of the integrator is returned to zero at the beginning of each reset pulse. Since the output of the integrator increases linearly from the end of each reset pulse, the magnitude of the output immediately before the integrator is reset is a measure of the time interval between successive reset pulses. Since the pulses on the line 23 occur immediately before the reset pulses, these are used to sample the output of the integrator and for this purpose a switch 28 is connected to the line 27 and is closed for the duration of each pulse on the line 23. The output of the switch 28 is applied to a store 29 so that the voltage in the store is a measure of the time interval between the reset pulses. Since, as already stated, this time interval is determined by the pulses in the pulse train at the output of the limiter 17, the voltage in the store 29 is a measure of the time interval between two successive pulses in the input train.

To facilitate display of the information provided by the apparatus so far described, means are provided for producing a second train of pulses, the pulse repetition frequency of which is greater than the pulse repetition frequency of the pulse train at the output of the limiter 17, the frequency of said second train varying inversely with the voltage on the store 29. Since the voltage on the store 29 is proportional to the interval between successive heartbeats, the pulse repetition frequency of the second pulse train will be proportional to the heart rate. Further, since the frequency may be selected in any desired range, it may be used for the control of a standard counter or analogue rate meter circuit, and can thus be used conveniently to display the number of heartbeats per minute. This part of the apparatus includes a switch 30 for connecting the input of an integrator or ramp generator 31 alternatively to the two terminals of a reference source. These terminals are indicated on the drawing by the symbols + and −. The apparatus also includes a two-state comparator 32 having two inputs 33 and 34 and which is in one state when its input 33 is more positive than its input 34 and in its other state when its input 34 is more positive than its input 33. The apparatus also includes a switch 35 for connecting the input 33 alternatively to the output of the store 29 and to earth. The output of the ramp generator 31 is connected to the terminal 34 and the two switches 30 and 35 are controlled by the output of the comparator 32.

In considering the operation of this part of the apparatus, it will be assumed that the voltage in the store 29 is positive with respect to earth and that the position of the switch 30 is such that the output of the ramp generator 31 becomes increasingly positive with respect to earth. If the position of the switch 35 is initially such that the output of the store 29 is connected to the terminal 33, the comparator 32 will be in its one state until the output of the ramp generator reaches the potential of the store 29. At this time, the comparator 32 will change to its other state and will reverse the switches 35 and 30. As a result, the terminal 33 will be connected to earth and the output of the ramp generator will vary in the opposite direction so that it becomes less positive with respect to earth. When it reaches earth potential, the state of the comparator will again change and, accordingly, the two switches 30 and 35 will return to their initial positions and the cycle will recommence. Thus, a train of constant amplitude pulses will be produced at the output of the comparator, the pulse repetition frequency of this train being inversely proportional to the potential difference between the two inputs of the switch 35, in other words, to the potential of the store 29 with respect to earth. This train could, therefore, be used directly to operate a counter but further means are provided to remove any remaining spurious signals. For this purpose, the train from the output of the comparator 32 is applied to two pump circuits 36 and 37. The pump circuit 36 has a time constant which is much longer than the time constant of the pump circuit 37. As a result, the output of the pump circuit 37 is in the form of a voltage, the magnitude of which represents the instantaneous value of the pulse repetition frequency, whereas the output of the pump circuit 36 is a voltage representing the value of the pulse repetition frequency averaged over a predetermined period of time. The outputs of the two pump circuits 36 and 37 are applied to the inputs of a difference amplifier 38, the output of which is a measure of the magnitude of any difference between the output of the two pump circuits. This output is applied to a level detector 39 which produces an output on a line 40 whenever the difference exceeds a predetermined minimum in either sense. The line 40 controls a switch 41 which is connected between the output of the instantaneous pump circuit 37 and a store 42. Thus, the arrangement is such that, in the absence of a signal on the line 40, the output of the pump circuit 37 is connected to the store 42, which is able to follow the voltage of the pump circuit 37 and to provide an output representing the instantaneous value of the pulse repetition frequency from the comparator 52. On the other hand, when a signal is produced on the line 40, the switch 41 disconnects the store 42 from the pump 37 and the design of the store 42 is such that the output continues until the end of the signal on the line 40 to represent the pulse repetition frequency at the output of the comparator 32 immediately before the beginning of the signal on the line 40. A power amplifier (not shown) is driven by the output of the store 42 and can be used for controlling any desired recording or indicating means.

Figure 2:
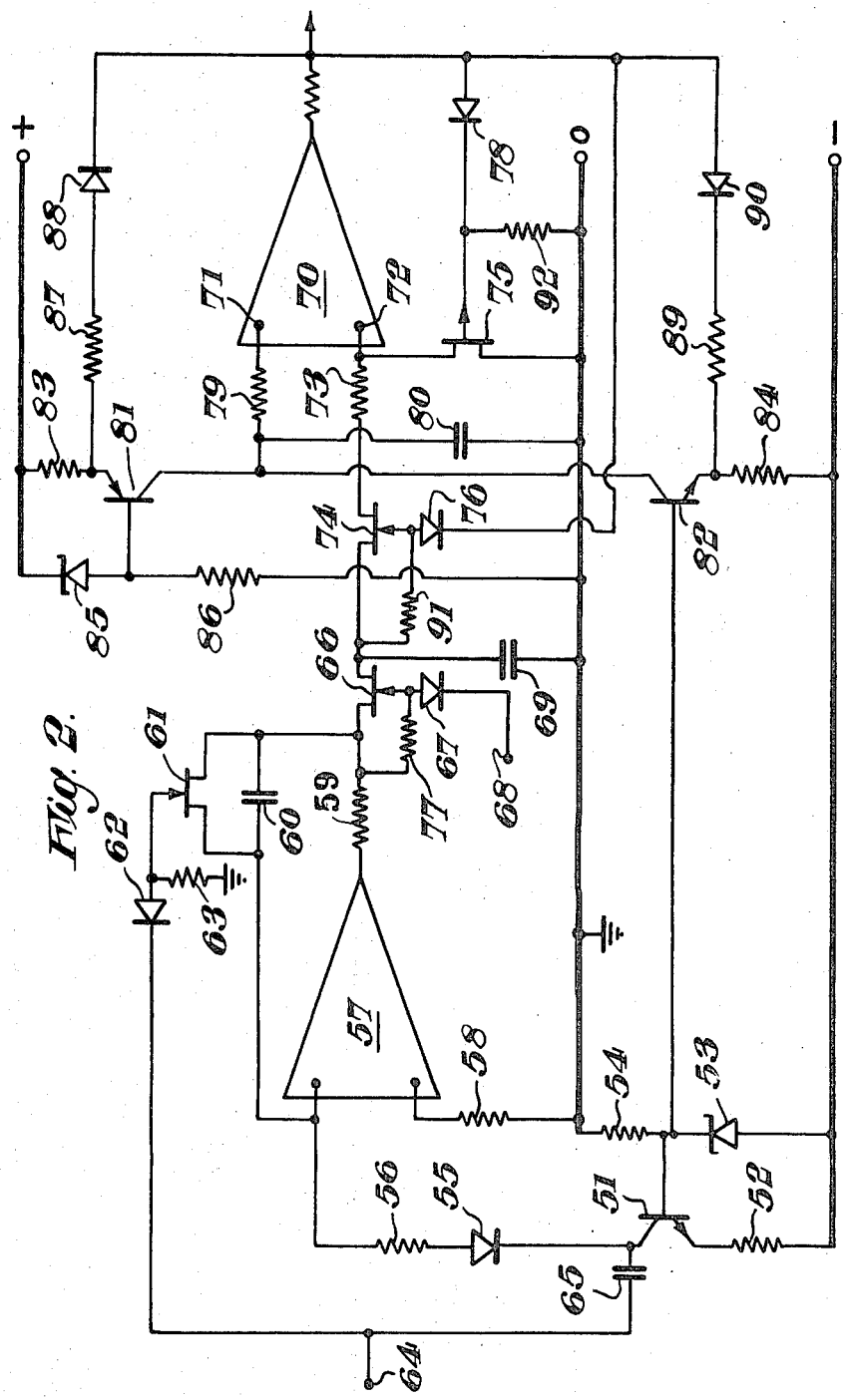
FIG. 2 is a simplified circuit diagram of a part of the apparatus illustrated in FIG. 1.

FIG. 2 is a simplified circuit diagram of the reference source 43, the integrator 26, the store 29, the switches 28, 30 and 35, the ramp generator 31 and the comparator 32 of FIG. 1. The reference source 43 is constituted by a transistor 51, the emitter of which is connected to a negative power supply through a resistor 52 and the base electrode of which is maintained at a constant potential by means of a Zener diode 53 connected between the negative supply and earth through a resistor 54. The collector of the transistor 51 is connected through a diode 55 and a resistor 56 to one input terminal of an operational amplifier 57. The other input terminal of this amplifier is connected to earth through a resistor 58 and the output of the amplifier is connected through a resistor 59 and a capacitor 60 to said one input terminal so that the amplifier acts as an integrator. The transistor 51 supplies the integrating amplifier with a constant current and, accordingly, the output of the amplifier increases substantially linearly.

The source and drain electrodes of a field-effect transistor 61 are connected across the integrating capacitor 60 and the gate electrode of this transistor is connected through a diode 62 to a terminal 64. This electrode is also connected to earth through a resistor 63. The terminal 64 is connected to the output of the monostable device 24 (FIG. 1) and the arrangement is such that the field-effect transistor is normally non-conductive but becomes conductive in the presence of each of the reset pulses from the monostable device 24. Thus, each reset pulse discharges the capacitor 60 and returns the output of the integrating amplifier 57 to zero. After the end of each reset pulse, the output increases substantially linearly until the beginning of the next reset pulse.

Since the reset pulses have a finite width (determined by the time required to discharge the capacitor 60), the output of the integrator cannot commence to rise until the end of each reset pulse so that the amplitude of the ramp produced by the amplifier depends on the time interval between the end of one reset pulse and the beginning of the next reset pulse. Since this arrangement could introduce errors if the duration of the reset pulse varies, means are provided to cause the level of the output of the integrator to be the same as it would have been if the ramp had commenced at the beginning of the reset pulse. For this purpose, a storage capacitor 65 is connected between the input terminal 64 and the collector of the transistor 51. With this arrangement, the capacitor 65 will charge throughout the reset pulse and the charge on the capacitor 65 will be added to the input of the integrator at the end of the reset pulse so that the ramp voltage increases initially at a greater rate than would have been the case in the absence of the charge on the capacitor. This increased rate of increase compensates for the fact that the ramp voltage does not start to rise until the end of the reset pulse.

The output of the integrating amplifier 57 is applied to the source electrode of a field-effect transistor 66, the drain electrode of which is connected to a storage capacitor 69. The gate electrode of the field-effect transistor is connected to the source electrode through a resistor 77 and through a diode 67 to an input terminal 68 which is, in turn, connected to the output of the monostable device 22 (FIG. 1). The pulses from the monostable device 22 occur immediately before the reset pulses from the monostable device 24 and, accordingly, the field-effect transistor 66 serves to sample the output of the integrator at the top of the ramp and to store the sampled output on the capacitor 69. Thus, the voltage on the capacitor 69 is proportional to the time interval between adjacent pulses at the output of the limiter 17, and this capacitor constitutes the store 29 of FIG. 1.

The comparator 32 of FIG. 1 is constituted by a differential amplifier 70 having input terminals 71 and 72 and designed to have a constant amplitude output. The input terminal 72 is connected through a resistor 73 to the drain electrode of a field-effect transistor 74, the source electrode of which is connected to the capacitor 69. The terminal 72 is also connected directly to the source electrode of a field-effect transistor 75, the drain electrode of which is connected to earth. The gate electrode of the field-effect transistor 74 is connected to the source electrode through a resistor 91 and through a diode 76 to the output of the amplifier 70, while the gate electrode of the field-effect transistor 75 is connected to earth through a resistor 92 and through a diode 78 to the output of the amplifier. It will be seen that the field-effect transistors are of opposite conductivity type so that one is conductive while the other is non-conductive. Thus, these two field-effect transistors and associated components constitute the switch 35 of FIG. 1 and serve to connect the terminal 72 of the amplifier 70 alternately to the two plates of the capacitor 69.

The input terminal 71 of the amplifier 70 is connected through a resistor 79 to one side of a capacitor 80, the other side of which is connected to earth. This capacitor constitutes the integrator or ramp generator 31 of FIG. 1 and is charged and discharged from constant current sources constituted by transistors 81 and 82. The transistors are of opposite conductivity type and the collectors of both transistors are connected to the capacitor 80. The emitter of the transistor 81 is connected through a resistor 83 to a positive supply line, while the emitter of the transistor 82 is connected through a resistor 84 to the negative supply line. The base electrode of the transistor 81 is connected to the junction of a Zener diode 85 and a resistor 86 is connected in series between the positive supply line and earth, while the base electrode of the transistor 82 is connected to the junction between the Zener diode 53 and the resistor 54. The emitter of the transistor 81 is also connected through a resistor 87 and a diode 88 to the output of the comparator, while the emitter of the transistor 82 is connected through a resistor 89 and a diode 90 to the same output. Since the transistors are of opposite conductivity type and the diodes 88 and 90 are oppositely directed, the two transistors 81 and 82 are caused to be conductive alternately.

The operation of this part of the apparatus has been considered in some detail in connection with FIG. 1, but the description of this operation will be repeated in connection with the actual components illustrated in FIG. 2. As in the case of FIG. 1, it will be assumed that the capacitor 69 has been charged so that the upper plate in the drawing is positive with respect to the plate that is connected to earth, and it will also be assumed that the output of the amplifier 70 is positive with respect to earth so that the transistor 81 is conductive. Thus, the potential on the capacitor 80 is becoming increasingly positive with respect to earth. Under these conditions, the field-effect transistor 74 will be conductive and the field-effect transistor 75 will be non-conductive so that the potential on the capacitor 69 will be applied to the terminal 72 of the amplifier 70. As soon as the capacitor 80 is charged to such an extent that the terminal 71 of the amplifier 70 becomes slightly positive with respect to the terminal 72, the output of the amplifier will become negative so that the transistor 82 will become conductive in place of the transistor 81, and the field-effect transistor 75 will become conductive in place of the field-effect transistor 74. Thus, the terminal 72 of the amplifier 70 will now be substantially at earth potential and the capacitor 80 will discharge through the transistor 82 until the terminal 71 becomes negative with respect to earth. At this point, the output of the amplifier will once again become positive and the initial conditions will be restored. Thus, a train of pulses is produced at the output of the amplifier, the pulse repetition frequency of which is inversely proportional to the voltage on the capacitor 69. In view of the design of the amplifier 70, this pulse train has a constant amplitude.

Figure 3:
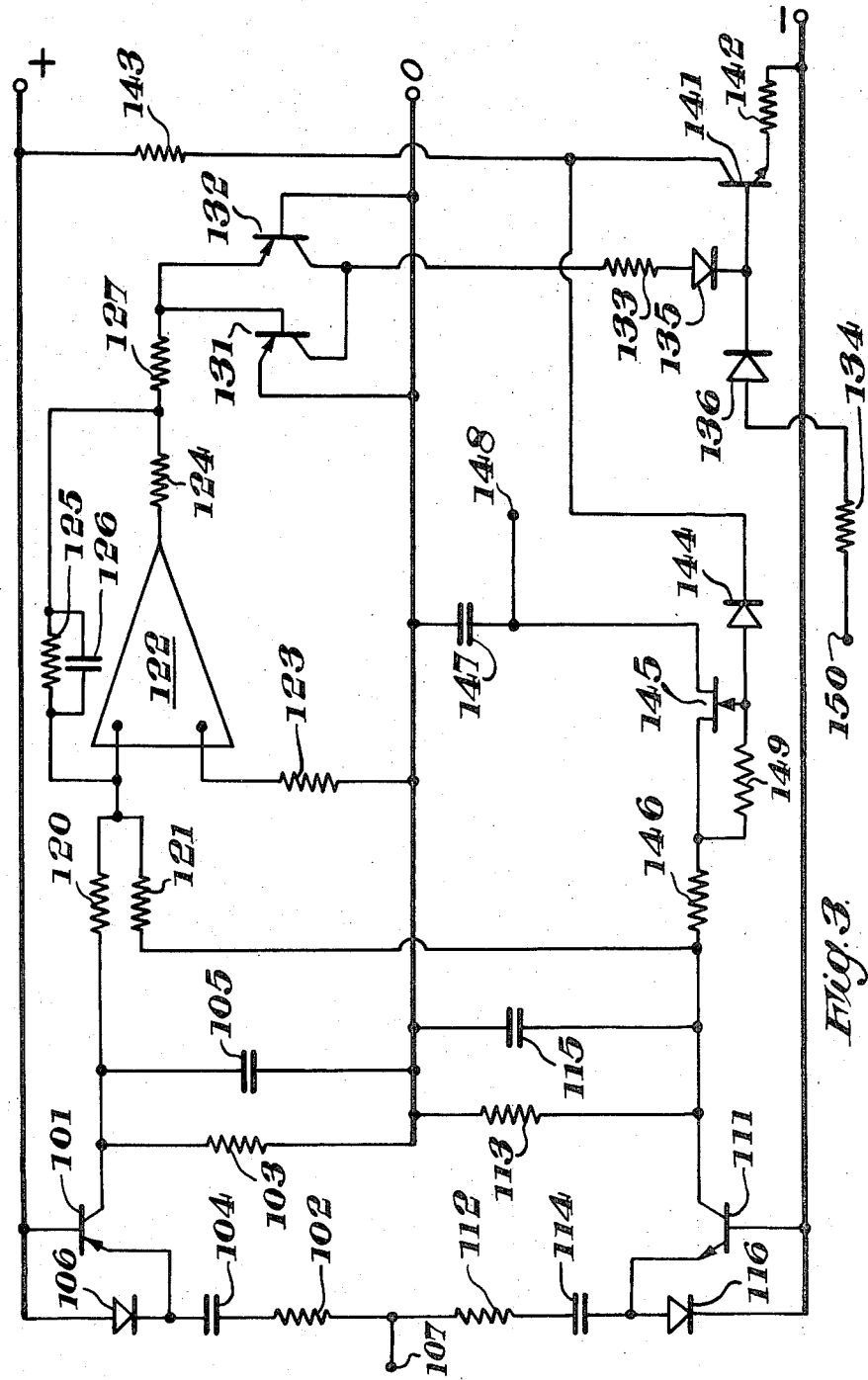
FIG. 3 is a simplified circuit diagram of a further part of the apparatus illustrated in FIG. 1.

FIG. 3 is a simplified circuit diagram of the pumps 36 and 37, the difference amplifier 38, the level detector 39, the switch 41 and the store 42. The pump circuit 36 is constituted by a transistor 101, resistors 102 and 103, capacitors 104 and 105, and a diode 106. The pulse train from the output of the amplifier 70 (FIG. 2) is applied to an input terminal 107 which is connected through the resistor 102 to one side of the capacitor 104, the other side of which is connected through the diode 106 to a positive supply line. The junction between the diode and the capacitor is connected to the emitter of the transistor 101, the base electrode of which is connected to the positive supply line. The collector of the transistor 101 is connected to a resistive load constituted by the resistor 103, in parallel with which is the capacitor 105. In such an arrangement, the voltage across the capacitor 105 is a measure of the pulse repetition rate of the input signal. The capacitor 105 has a relatively high value, for example 100 $\mu$F and, accordingly, the voltage across it will only respond gradually to changes in the repetition rate so that an average value is produced.

The pump circuit 37 is constituted by a transistor 111, resistors 112 and 113, capacitors 114 and 115 and a diode 116. The circuit is arranged in the same way as the components constituting the pump circuit 36 except that the transistor 111 is of opposite conductivity type to the transistor 101 and the collector is connected to a negative supply line instead of a positive supply line. The value of the capacitor 115 is very much less than that of the capacitor 105 and may be, for example, 5 $\mu$F. Thus, the voltage across this capacitor can follow all variations in the repetition rate of the input pulse train and represents a substantially instantaneous value of this rate.

The voltage across the capacitors 105 and 115 are applied through resistors 120 and 121 to one input terminal of an operational amplifier 122, the other input terminal of which is connected through a resistor 123 to earth. The output of the amplifier is fed back to said one input terminal through a resistor 124 and the parallel combination of a resistor 125 and a capacitor 126. The amplifier is arranged to produce an output signal proportional to the difference between the voltages on the two capacitors 105 and 115. Thus, the output is a measure of any difference between the instantaneous and average values of the pulse repetition rate of the input signal.

The level detector 39 (FIG. 1) is constituted by two transistors 131 and 132 and the difference signal from the amplifier 122 is applied through a resistor 127 to the base electrode of the transistor 131 and the emitter of the transistor 132. The emitter of the transistor 131 is connected to earth as also is the base electrode of the transistor 132. The collectors of the two transistors are connected together and to one input of an OR-gate constituted by resistors 133 and 134 and diodes 135 and 136. The two transistors 131 and 132 are of the same conductivity type and serve to apply an input to the OR-gate whenever the difference signal at the output of the amplifier 122 exceeds a predetermined level in either sense.

The output of the OR-gate is amplified and inverted by a transistor 141, the base electrode of which is connected to the junction of the two diodes 135 and 136. The emitter of this transistor is connected to the negative supply through a low-value resistor 142 and the collector is connected to the positive supply through a resistor 143. The collector of this transistor is also connected through a diode 144 to the gate electrode of a field-effect transistor 145. The source electrode of this field-effect transistor is connected to the gate electrode through a resistor 149 and through a resistor 146 to the capacitor 115, while the drain electrode is connected to a capacitor 147 which constitutes the store 42 (FIG. 1). The voltage across the capacitor 147 is applied to a terminal 148 which leads to a high-input-impedance power amplifier which operates the recording or indicating instrument.

It will be seen that, so long as the difference between the instantaneous and averaged values of the pulse repetition frequency is less than a predetermined amount, the field-effect transistor 145 is conductive so that the voltage on the capacitor 147 follows the voltage on the capacitor 115 and hence is a measure of the instantaneous value of the pulse repetition rate. However, if the difference between the instantaneous and averaged values exceeds a predetermined minimum, a signal is applied to the OR-gate and through the transistor 141 to render the field-effect transistor 145 non-conductive. Under these conditions, the voltage on the capacitor 147 can no longer follow variations in the voltage on the capacitor 115 and, accordingly, the output on the terminal 148 remains a measure of the instantaneous value of the pulse repetition rate immediately before the difference signal was produced.

It will be understood that in an arrangement as so far described, the leading edge of any spurious signal will reach the capacitor 147 before the field-effect transistor 145 can be turned off. Accordingly, if the indicating or recording means is able to respond to this leading edge, the result may be misleading. For this reason, the resistor 146 is given such a value that there is a small delay in the transfer of the voltage from the capacitor 115 to the capacitor 147. Further, the blanking signal from the output of the monostable device 19 (FIG. 1) which occurs immediately after each heartbeat is applied to a terminal 150 which constitutes the second input of the OR-gate. Thus, the field-effect transistor 145 is rendered non-conductive for 270 mS after each heartbeat, and the voltage on the capacitor 147 cannot be changed during this period.

What is claimed is:

1. Diagnostic apparatus including means for transmitting ultrasonic energy of a frequency in the region of 2 MHz, means for receiving part of said energy after reflection and for mixing it with the energy as transmitted to produce a signal containing frequencies which vary with the rate of movement of the surfaces from which the energy is reflected, means for selecting band of frequencies closely centered on 210 Hz from said signal and for deriving a first pulse train therefrom, means for producing a voltage proportional to the time interval between adjacent pulses of the first pulse train, and means for producing a second train of pulses, the pulse repetition frequency of which is greater than the pulse repetition frequency of the first pulse train and varies inversely with said voltage.

2. Apparatus as claimed in claim 1, wherein the width of said band is substantially 10 Hz.

3. Apparatus as claimed in claim 1, wherein the ultrasonic energy is transmitted by a transducer which emits a divergent beam and is received by a plurality of receiving crystals arranged around said transducer.

4. Diagnostic apparatus including means for transmitting ultrasonic energy, means for receiving part of said energy after reflection and for mixing it with the energy as transmitted to produce a signal containing frequencies which vary with the rate of movement of the surfaces from which the energy is reflected, means for selecting at least one band of frequencies from said signal and for deriving a first pulse train therefrom, means for producing a voltage proportional to the time interval between adjacent pulses of the first pulse train, and means for producing a second train of pulses, the pulse repetition frequency of which is greater than the pulse repetition frequency of the first pulse train and varies inversely with said voltage said voltage-producing means comprising means for deriving third and fourth time-displaced pulse trains from said first pulse train, the pulses in said third and fourth trains being of shorter duration than the pulses in said first train, integrating means fed from a reference source for generating a ramp signal, means controlled by said third train for sampling the output of said integrating means and means controlled by said fourth train for resetting said integrating means.

5. Apparatus as claimed in claim 4, wherein each pulse in said third pulse train is initiated by the leading edge of a pulse in said first train and each pulse in said fourth train is initiated by the trailing edge of the corresponding pulse of the third train.

6. Apparatus as claimed in claim 5, wherein a storage capacitor is connected via a diode to the input of the integrating means, and wherein the reset pulse is applied to this capacitor so that the capacitor will charge throughout the reset pulse and the charge on the capacitor will be added to the input of the integrator at the end of the reset pulse.

7. Diagnostic apparatus including means for transmitting ultrasonic energy, means for receiving part of said energy after reflection and for mixing it with the energy as transmitted to produce a signal containing frequencies which vary with the rate of movement of the surfaces from which the energy is reflected, means for selecting at least one band of frequencies from said signal and for deriving a first pulse train therefrom, means for producing a voltage proportional to the time interval between adjacent pulses of the first pulse train, and means for producing a second train of pulses, the pulse repetition frequency of which is greater than the pulse repetition frequency of the first pulse train and varies inversely with said voltage the means for producing the second pulse train comprising first switching means for connecting the input of a ramp generator alternately to the two terminals of a reference source, a two-state comparator which is in one state when one of its inputs is more positive than the other input and in its other state when its other input is more positive than its one input, and second switching means connecting said one input alternately to the two terminals across which said voltage is produced, wherein the output of said ramp generator is applied to said other input of said comparator, wherein said first and second switching means are controlled by the output of said comparator so that the output of said ramp generator varies in one direction until it reaches the potential of one of said two terminals and in the opposite direction until its output reaches the potential of the other of said two terminals, and wherein said second pulse train is taken from the output of said comparator.

8. Diagnostic apparatus including means for transmitting ultrasonic energy, means for receiving part of said energy after reflection and for mixing it with the energy as transmitted to produce a signal containing frequencies which vary with the rate of movement of the surfaces from which the energy is reflected, means for selecting at least one band of frequencies from said signal and for deriving a first pulse train therefrom, means for producing a voltage proportional to the time interval between adjacent pulses of the first pulse train, and means for producing a second train of pulses, the pulse repetition frequency of which is greater than the pulse repetition frequency of the first pulse train and varies inversely with said voltage means for generating a first electrical quantity representing the pulse repetition frequency of said second pulse train measured over a first predetermined time, means for generating a second electrical quantity representing the pulse repetition frequency of said second pulse train measured over a second predetermined period of time shorter than said first period of time, means for comparing said first and second quantities and for producing a switching signal when the difference between said quantities exceeds a predetermined minimum, and a memory device for storing said second quantity, wherein said memory device is controlled by said switching signal in such a way that, in the absence of the switching signal, the output of the memory device represents the instantaneous value of said second quantity, whereas, in the presence of said switching signal, the output of the memory device represents the value of said second quantity immediately before the beginning of the switching signal.

9. Apparatus as claimed in claim 8, wherein said means for generating said first and second electrical quantities are constituted respectively by first and second transistor storage counter circuits.

10. Apparatus as claimed in claim 9, wherein each of said transistor storage counter circuits includes a first capacitor in series with a diode, the junction of said capacitor and said diode being connected to the emitter of a transistor, the collector of which is connected to a resistive load in parallel with which is a second capacitor.

11. Apparatus as claimed in claim 10, wherein the voltages on the second capacitors of said first and second transistor storage counter circuits are applied to an operational amplifier which produces an output signal proportional to the difference between said two voltages.

12. Apparatus as claimed in claim 11, wherein the output of said operational amplifier is applied to a level detector which produces said switching signal when the voltage on either of said second capacitors exceeds that on the other by more than a predetermined amount.

13. Apparatus as claimed in claim 8, wherein the memory device is in the form of a track/store amplifier, the output of which operates a recording device.

14. Apparatus as claimed in claim 13, wherein the track/store amplifier is periodically changed over to its storage function for a predetermined period after each pulse in said first pulse train.

15. Apparatus as claimed in claim 14, wherein said periodic change of said track/store amplifier is controlled by the output of a monostable device, said output also being used to close a gate between said selecting means and said voltage-producing means.

16. Diagnostic apparatus particularly useful for detecting foetal heart beats, comprising in combination:

means for transmitting ultrasonic energy of a first frequency which causes Doppler-shifted reflections from a foetus and its surroundings which reflections have a frequency spectrum including a selected frequency component unique to normal functioning of the foetal heart and occurring at the same the same point in time during each foetal heart beat, said selected frequency component being 210 Hz when said first frequency is 2 MHz;

means for receiving said reflections;

narrow bandpass filter means connected to said means for receiving for rejecting substantially all frequency components of said reflections except said selected frequency component; and means for determining foetal heart rate from the selected frequency component of said reflections passed by said filter means.

17. Diagnostic apparatus according to claim 16 wherein said means for determining includes pulse generating means for generating a train of similar pulses in consonance with the timing of said reflections of selected frequency passed by said filter means, and means for producing a voltage proportional to the frequency of said train of pulses.

18. Diagnostic apparatus according to claim 17 wherein said means for determining also includes second pulse generating means connected to said means for producing a voltage for generating a second train of pulses having a pulse repetition frequency varying with said voltage.

* * * * *

UNITED STATES PATENT OFFICE
CERTIFICATE OF CORRECTION

Patent No. 3,813,654　　　　　Dated May 28, 1974

Inventor(s) David A. Clifton and Frederick D. Fielder

It is certified that error appears in the above-identified patent and that said Letters Patent are hereby corrected as shown below:

In the patent heading, insert the following:

Foreign Application Priority Data

|  |  |  |
|---|---|---|
| Oct. 20, 1970 | Great Britain | 49650/70 |
| Oct. 20, 1970 | Great Britain | 49701/70 |
| Oct. 20, 1970 | Great Britain | 49702/70 |

Signed and sealed this 24th day of September 1974.

(SEAL)
Attest:

McCOY M. GIBSON JR.　　　　　　C. MARSHALL DANN
Attesting Officer　　　　　　　Commissioner of Patents